United States Patent
Chang et al.

(10) Patent No.: US 8,289,690 B2
(45) Date of Patent: Oct. 16, 2012

(54) EXPANSION CARD RETENTION ASSEMBLY AND COMPUTER INCORPORATING THE SAME

(75) Inventors: Chun-Wei Chang, Taipei Hsien (TW); Jui-Feng Hu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 289 days.

(21) Appl. No.: 12/758,739

(22) Filed: Apr. 12, 2010

(65) Prior Publication Data

US 2011/0122569 A1    May 26, 2011

(30) Foreign Application Priority Data

Nov. 23, 2009 (CN) .......................... 2009 1 0310216

(51) Int. Cl.
*G06F 1/16* (2006.01)
*H05K 5/00* (2006.01)
*H05K 7/00* (2006.01)

(52) U.S. Cl. .................. 361/679.32; 361/752; 361/759; 361/801

(58) Field of Classification Search .......... 361/679.31–679.45, 784, 796, 361/801, 802, 748, 752, 759
See application file for complete search history.

(56) References Cited

U.S. PATENT DOCUMENTS

| | | | | |
|---|---|---|---|---|
| 5,214,572 A * | 5/1993 | Cosimano et al. | ............ | 361/802 |
| 5,594,627 A * | 1/1997 | Le | ................................ | 361/801 |
| 5,642,263 A * | 6/1997 | Lauruhn | ........................ | 361/801 |
| 5,708,563 A * | 1/1998 | Cranston et al. | ........... | 361/679.6 |
| 5,734,551 A * | 3/1998 | Hileman et al. | .............. | 361/695 |
| 5,822,193 A * | 10/1998 | Summers et al. | ............. | 361/759 |
| 5,884,779 A * | 3/1999 | Rich | .......................... | 211/41.17 |
| 5,963,424 A * | 10/1999 | Hileman et al. | .............. | 361/695 |
| 6,017,004 A * | 1/2000 | Grantham | .................... | 248/27.3 |
| 6,220,887 B1* | 4/2001 | Downs | ........................... | 439/377 |
| 6,278,614 B1* | 8/2001 | Beaman et al. | ................ | 361/752 |
| 6,349,029 B1* | 2/2002 | Leman et al. | ............ | 361/679.57 |
| 6,353,541 B1* | 3/2002 | Leman et al. | .................. | 361/809 |
| 6,356,438 B1* | 3/2002 | Leman et al. | ............. | 361/679.4 |
| 6,409,518 B1* | 6/2002 | Hung | ................................ | 439/61 |
| 6,430,041 B1* | 8/2002 | Johnson et al. | .......... | 361/679.48 |
| 6,466,448 B1* | 10/2002 | Baik | .............................. | 361/752 |
| 6,775,152 B2* | 8/2004 | Kohler et al. | .................. | 361/801 |
| 6,870,744 B2* | 3/2005 | Kosugi et al. | .................. | 361/801 |
| 6,885,565 B2* | 4/2005 | Shi | ................................. | 361/801 |
| 6,970,363 B2* | 11/2005 | Bassett et al. | ................. | 361/801 |
| 7,489,523 B2* | 2/2009 | Hsu | ................................. | 361/801 |
| 7,660,114 B2* | 2/2010 | Watanabe et al. | ............ | 361/690 |
| 7,787,258 B2* | 8/2010 | Cheney et al. | ................. | 361/801 |
| 7,933,129 B2* | 4/2011 | Chen | ................................ | 361/801 |
| 7,990,735 B2* | 8/2011 | Yeh et al. | ....................... | 361/801 |
| 2004/0246695 A1* | 12/2004 | Schlack | ......................... | 361/801 |
| 2005/0111203 A1* | 5/2005 | Bassett et al. | ................. | 361/755 |
| 2009/0067136 A1* | 3/2009 | Cheney et al. | ................ | 361/726 |

* cited by examiner

*Primary Examiner* — Adrian S Wilson
(74) *Attorney, Agent, or Firm* — Altis Law Group, Inc.

(57) ABSTRACT

A retention assembly for securing an expansion card includes a support plate, a retention seat mounted on the supporting plate, and a holder located on the retention seat. The support plate defines a through hole therein. The retention seat defines a sliding groove therethrough aligning with the through hole of the support plate. The holder includes a clamping portion at one end thereof. The holder extends through the sliding groove of the retention seat and the through hole of the supporting plate. The clamping portion extends beyond the supporting plate for clamping the expansion card.

20 Claims, 7 Drawing Sheets

– 1 –

EXPANSION CARD RETENTION ASSEMBLY AND COMPUTER INCORPORATING THE SAME

BACKGROUND

1. Technical Field

The disclosure generally relates to retention assemblies, and particularly to a retention assembly for securing an expansion card in a computer enclosure.

2. Description of Related Art

A typical computer with an expansion card includes an enclosure and a main circuit board in the enclosure. The main circuit board defines a peripheral component interconnect (PCI) slot therein. The expansion card has a card plug inserted into the PCI slot, for securing the expansion card on the main circuit board. However, during operation, vibration may cause the expansion card secured in this way to disconnect from the PCI slot.

What is needed, therefore, is an expansion card retention assembly and a computer incorporating the retention assembly which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
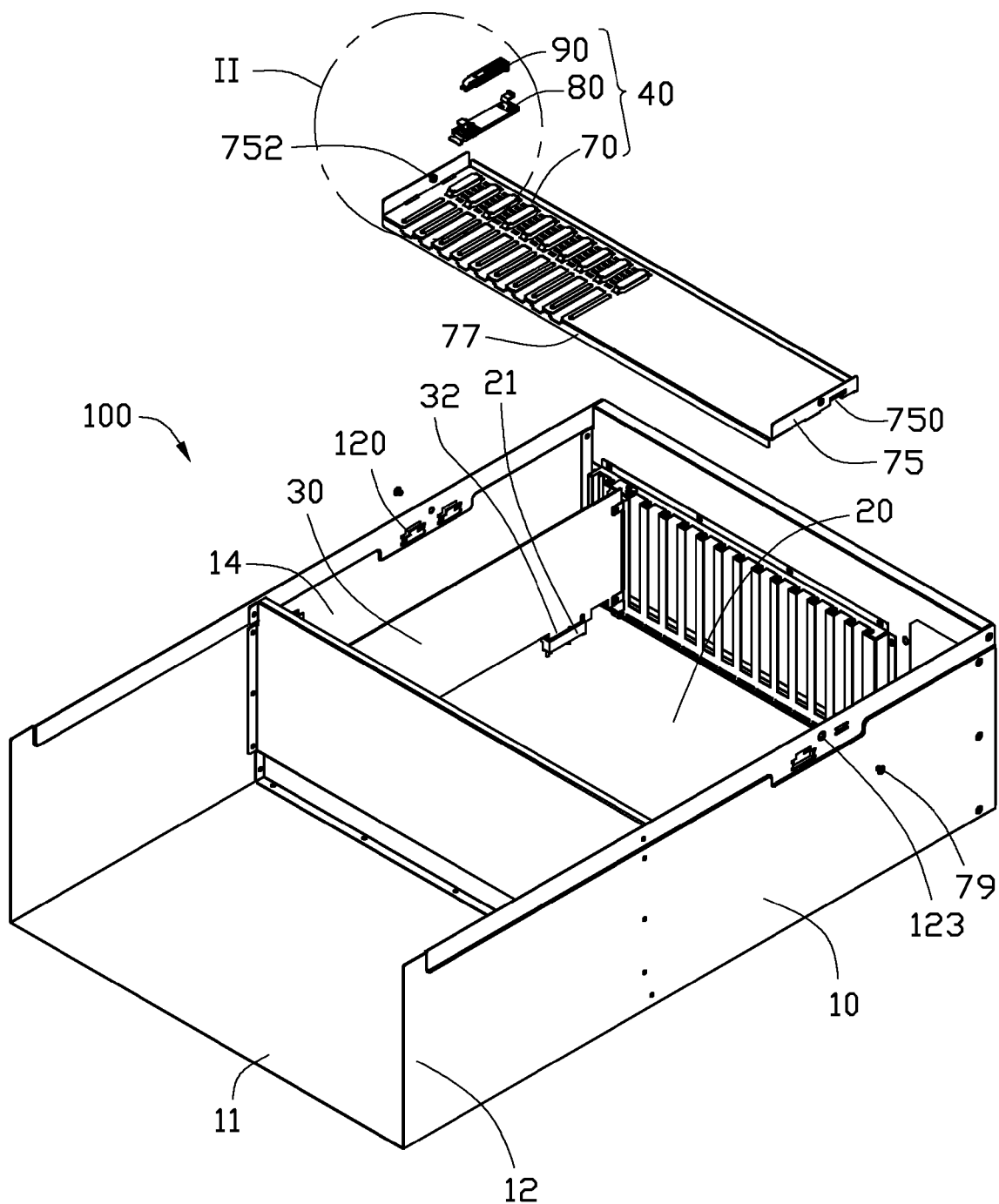
FIG. 1 is an exploded, isometric view of a computer in accordance with one embodiment of the disclosure.

Referring to FIG. 1, a computer 100 in accordance with one embodiment is shown. The computer 100 includes an enclosure 10, a main circuit board 20 and an expansion card 30 in the enclosure 10, and a retention assembly 40 for securing the expansion card 30 to the main circuit board 20.

The enclosure 10 is generally hollow and cuboid. The enclosure 10 includes a bottom wall 11, and two sidewalls 12 extending up from two opposite sides of the bottom wall 11, respectively. The bottom wall 11 and the sidewalls 12 cooperatively define a receiving chamber 14 therebetween, for receiving the main circuit board 20, the expansion card 30, and the retention assembly 40. Each of the sidewalls 12 includes two tabs 120 protruding out from a top end thereof to the receiving chamber 14. The tabs 120 of the sidewalls 12 are located above the expansion card 30. Each of the sidewalls 12 further defines a screw hole 123 between the tabs 120. The main circuit board 20 is secured on the bottom wall 11 of the enclosure 10. The main circuit board 20 defines a PCI slot 21

– 2 – therein. The expansion card 30 forms a card plug 32 at a bottom side thereof. The card plug 32 is inserted in the PCI slot 21 of the main board circuit 20.

The retention assembly 40 includes a support plate 70, a retention seat 80, and an elongated holder 90.

Figure 2:
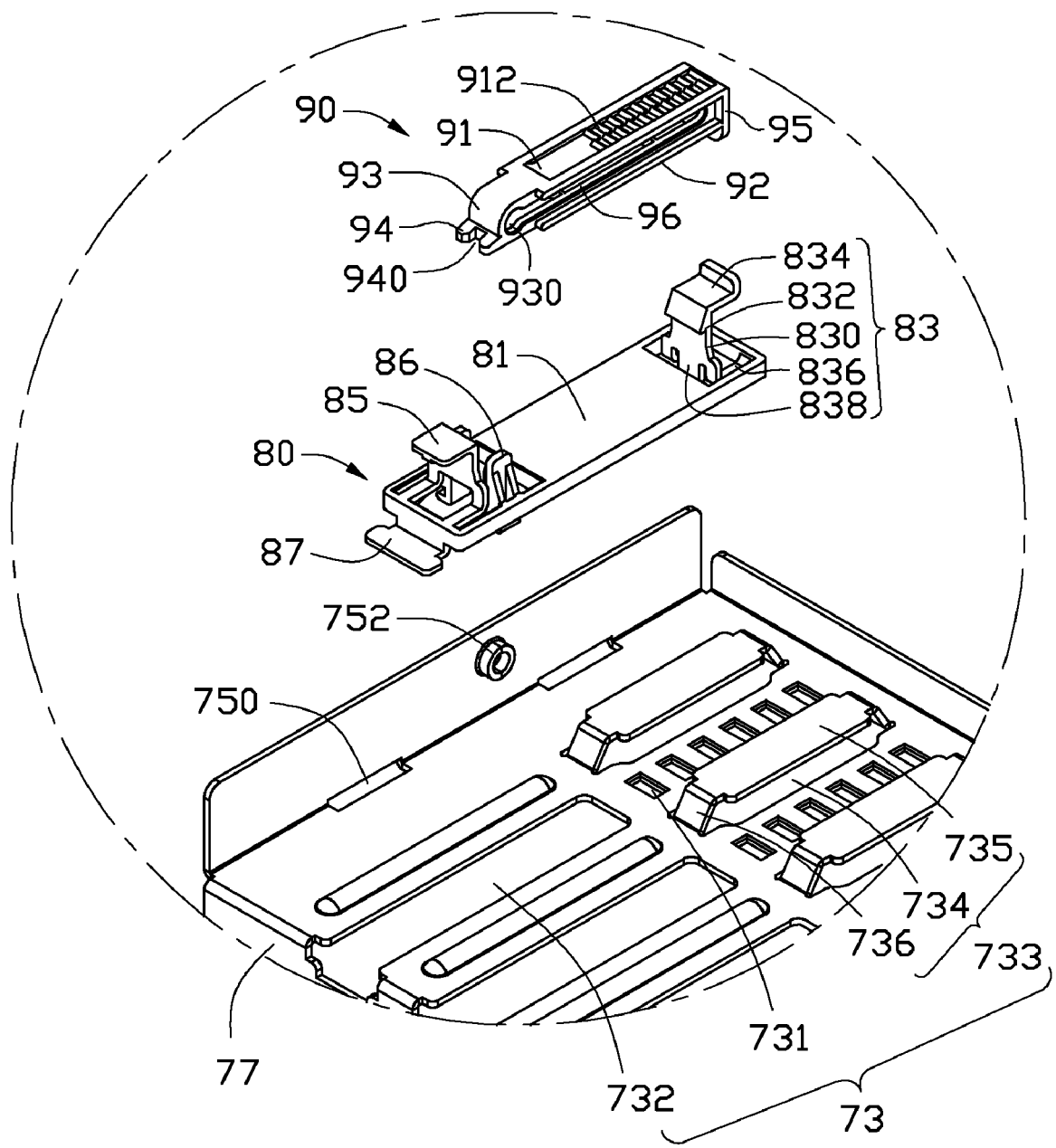
FIG. 2 is an enlarged view of a circled portion II of the computer of FIG. 1.

Referring also to FIG. 2, the support plate 70 is substantially rectangular, and includes a plurality of mounting units 73. Two fixing plates 75 extend respectively and upwardly from two opposite ends of the support plate 70, and a strengthening plate 77 depends from a lateral side of the support plate 70. The fixing plates 75 are perpendicular to the strengthening plate 77. The support plate 70 defines two fixing holes 750 in each end thereof adjacent to the fixing plates 75. The fixing holes 750 correspond to the tabs 120 of the sidewalls 12 of the enclosure 10, respectively. Each fixing plate 750 includes an internally threaded sleeve 752 protruding perpendicularly out from a center thereof. The support plate 70 has a length substantially equal to a distance between the two sidewalls 12. Two screws 79 are provided to extend through the screw holes 123 of the enclosure 10, and are screwed in the sleeve 752 of the fixing plate 750, respectively, for fixing the support plate 70 on the enclosure 10.

Each of the mounting units 73 includes a plurality of rectangular orienting holes 731 and a sliding groove 732 through the support plate 70, and two guide portions 733 located respectively at two opposite sides of the orienting holes 731. The orienting holes 731 align with the sliding groove 732. The orienting holes 731 and the sliding groove 732 are respectively located at two opposite sides of the support plate 70. The orienting holes 731 are spaced from each other, and are evenly distributed in the support plate 70. The sliding groove 732 is elongated and substantially rectangular, and extends through the strengthening plate 77. Each of the guide portions 733 includes a rectangular guide plate 735 and a pair of legs 736 at two opposite ends of the guide plate 735, respectively. The guide plate 735 is located above and parallel to the support plate 70. The pair of legs 736 connects the guide plate 735 with the support plate 70, for supporting the guide plate 735. Each of the legs 736 has a width less than that of the guide plate 735, so that an elongated guide groove 734 is defined beside the legs 736 and between the guide plate 735 and the support plate 70. A longitudinal direction of the guide groove 734 is parallel to an array direction of the orienting holes 731.

Figure 3:
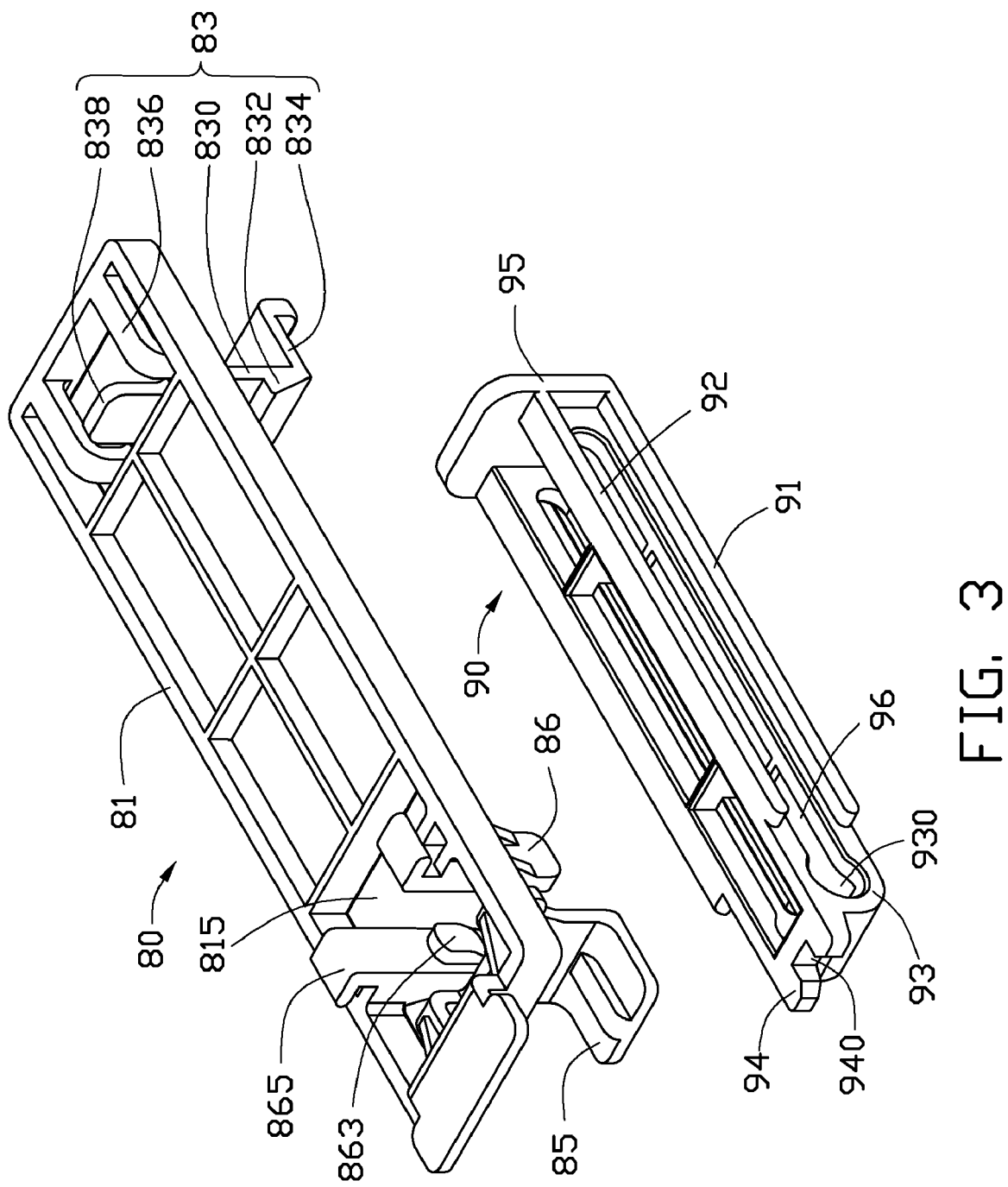
FIG. 3 is an enlarged, isometric view of a retention seat and a holder of the computer of FIG. 2, but viewed from another aspect.
Figure 4:
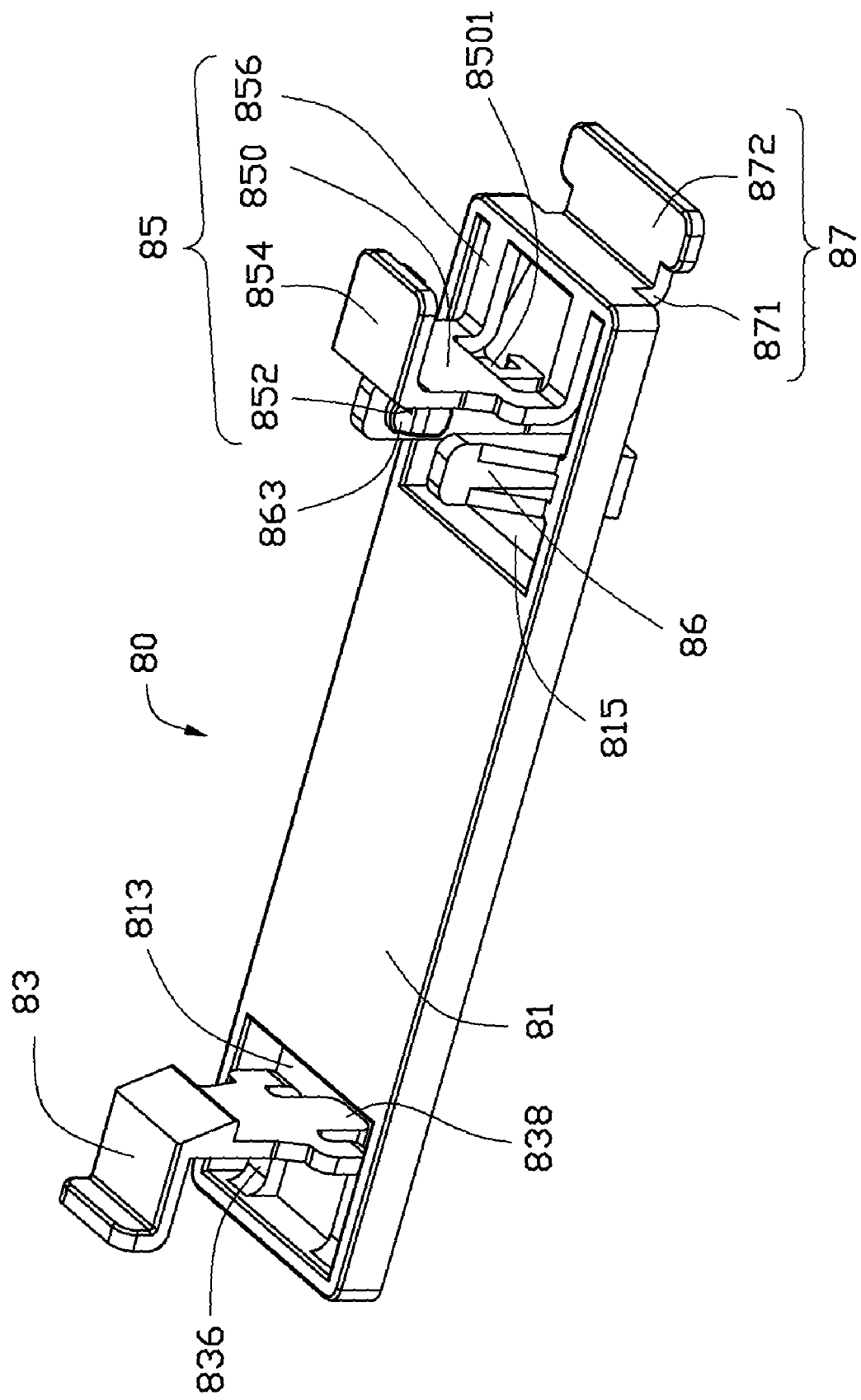
FIG. 4 is an inverted view of the retention seat of FIG. 3.

Referring to FIGS. 2-4, the retention seat 80 includes a rectangular sliding plate 81. A thickness of the sliding plate 81 is equal to a height of the guide groove 734 of the mounting units 73. In other words, the thickness of the sliding plate 81 is equal to a vertical distance between a bottom surface of the guide plate 735 of each guide portion 733 and a top surface of the support plate 70. The sliding plate 81 defines a first through hole 813 and a second through hole 815 in two opposite ends thereof, respectively. The retention seat 80 further includes a handle portion 83 adjacent to the first through hole 813, an actuating portion 85 adjacent to the second through hole 815, a pair of support arms 86 respectively at two opposite sides of the second through hole 815, and an orienting portion 87 extending from one end of the sliding plate 81 adjacent to the actuating portion 85.

The handle portion 83 and the actuating portion 85 are substantially U-shaped, and face each other. The handle portion 83 includes two elastic arms 836 extending from one end of the sliding plate 81 to the first through hole 813, a connecting wall 830 extending upwardly from the elastic arms 836, a mounting hook 832 and a press portion 834 at a top end of the connecting wall 830, and a stopper 838 at a bottom end of the connecting wall 830 (as shown in FIG. 4). The mounting hook 832 and the press portion 834 extend vertically out from two opposite sides of the connecting wall 830, respectively. The mounting hook 832 extends toward the actuating portion 85, and the press portion 834 extends away from the actuating portion 85. The stopper 838 extends from the connecting wall 830 toward the support plate 70, and is located between the two elastic arms 836. The actuating portion 85 is similar to the handle portion 83, and also includes two elastic arms 856 extending from another end of the sliding plate 81 to the second through hole 815, a connecting wall 850 extending upwardly from the elastic arms 856, and an engaging hook 852 and a press portion 854 at a top end of the connecting wall 850 (as shown in FIG. 4). The engaging hook 852 and the press portion 854 extend vertically out from two opposite sides of the connecting wall 850, respectively. The engaging hook 852 extends toward the handle portion 83, and the press portion 854 extends away from the handle portion 83. The connecting wall 850 defines a cutout 8501 at a bottom end thereof. The cutout 8501 is located between the two elastic arms 856.

Figure 6:
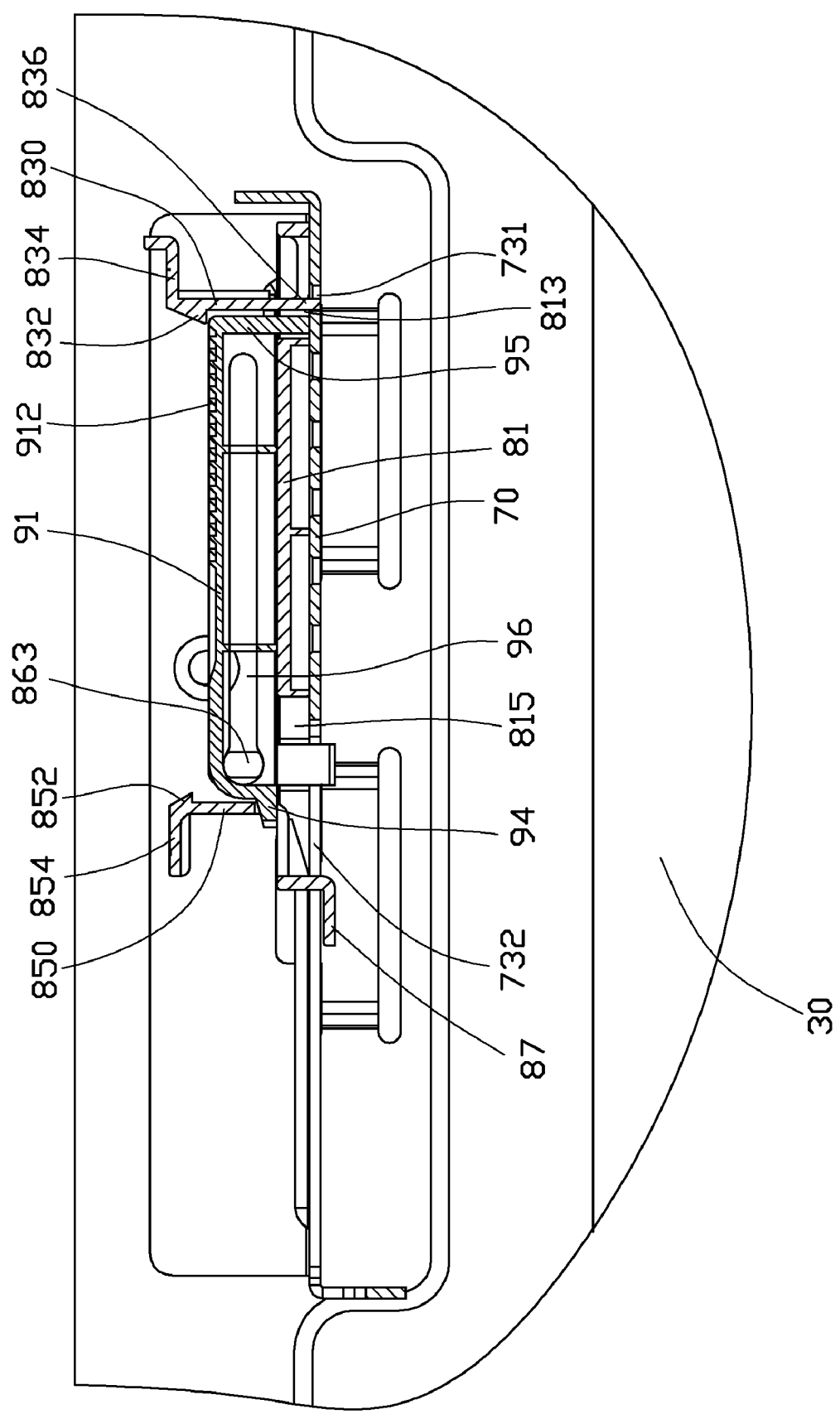
FIG. 6 is a cross section of the computer of FIG. 5, taken along line VI-VI thereof.

The support arms 86 face each other, and are disposed adjacent the side of the second actuating portions 85. Each of the support arms 86 includes a pivot 863 at an inner surface thereof, and a claw 865 at one end thereof toward the support plate 70. The pivots 863 of the support arms 86 extend toward each other, and the claws 865 of the support arms 86 extend away from each other. The orienting portion 87 has a substantially L-shaped cross section (as shown in FIG. 6). The orienting portion 87 includes an extension wall 871 extending perpendicularly out from the sliding plate 81, and an orienting wall 872 extending perpendicularly out from one free lateral side of the extension wall 871. The extension wall 871 has a length slightly smaller than a width of the sliding groove 732 of the support plate 70 along a direction perpendicular to the sliding groove 732. The orienting wall 872 is longer than the extension wall 871, namely greater than the width of the sliding groove 732, along the direction perpendicular to the sliding groove 732. The orienting wall 872 is generally parallel to the press portion 854.

The holder 90 includes a top plate 91, a bottom plate 92 parallel to the top plate 91, and a pivot portion 93 and a press plate 95 each connecting the top plate 91 and the bottom plate 92. The top plate 91 forms a plurality of parallel teeth 912 thereon. The pivot portion 93 and the press plate 95 are respectively located at two opposite ends of the top and bottom plates 91, 92. The press plate 95 extends perpendicularly beyond the bottom plate 92. The top and bottom plates 91, 92 cooperatively define a sliding slot 96 therebetween. The pivot portion 93 has an arcuate outer surface, and defines therein a pivot hole 930 in communication with the sliding slot 96. A diameter of the pivot hole 930 is substantially equal to an outer diameter of the pivot 863. A clamping portion 94 is protruded out from the bottom plate 92 adjacent to the pivot portion 93. The clamping portion 94 defines a semi-enclosed mounting slot 940 at a middle thereof. The mounting slot 940 has a width being substantially equal to a thickness of the expansion card 30.

During assembly of the retention assembly 40, the sliding plate 81 of the retention seat 80 laterally slides into the sliding groove 732 of a corresponding mounting unit 73 of the support plate 70, with a bottom surface of the sliding plate 81 abutting on a top surface of the support plate 70, and the claws 865 of the support arms 86 and two opposite ends of the orienting wall 872 beyond the extension wall 871 of the orienting portion 87 contacting a bottom surface of the support plate 70 beside the sliding groove 732. The stopper 838 is inserted into one of the orienting holes 731 of the corresponding mounting unit 73. Two lateral sides of the sliding plate 81 are respectively received in the guide grooves 734 of the two guide plate 733 of the corresponding mounting unit 73, and abut on bottom surfaces of the two guide plates 733 of the corresponding mounting unit 73. The second through hole 815 of the sliding plate 81 is located over the sliding groove 732 of the support plate 70. The holder 90 is mounted on the sliding plate 81 of the retention seat 80, with the bottom plate 92 of the holder 90 abutting on a top surface of the sliding plate 81 of the retention seat 80. The clamping portion 94 of the holder 90 is oriented in the cutout 8501 of the actuating portion 85 of the retention seat 80. A bottom portion of the press plate 95 extending beyond the bottom plate 92 is engaged in the first through hole 813 of the sliding plate 81 of the retention seat 80. A lateral side of the top plate 91 adjacent to the press plate 95 is hooked by the mounting hook 832 of the handle portion 83 of the retention seat 80. The pivots 863 of the support arms 86 are pivotably received in the pivot hole 930 of the pivot portion 93, so that the holder 90 can be movable between a non-retention position (as shown in FIG. 6) and a retention position (as shown in FIG. 7).

Figure 5:
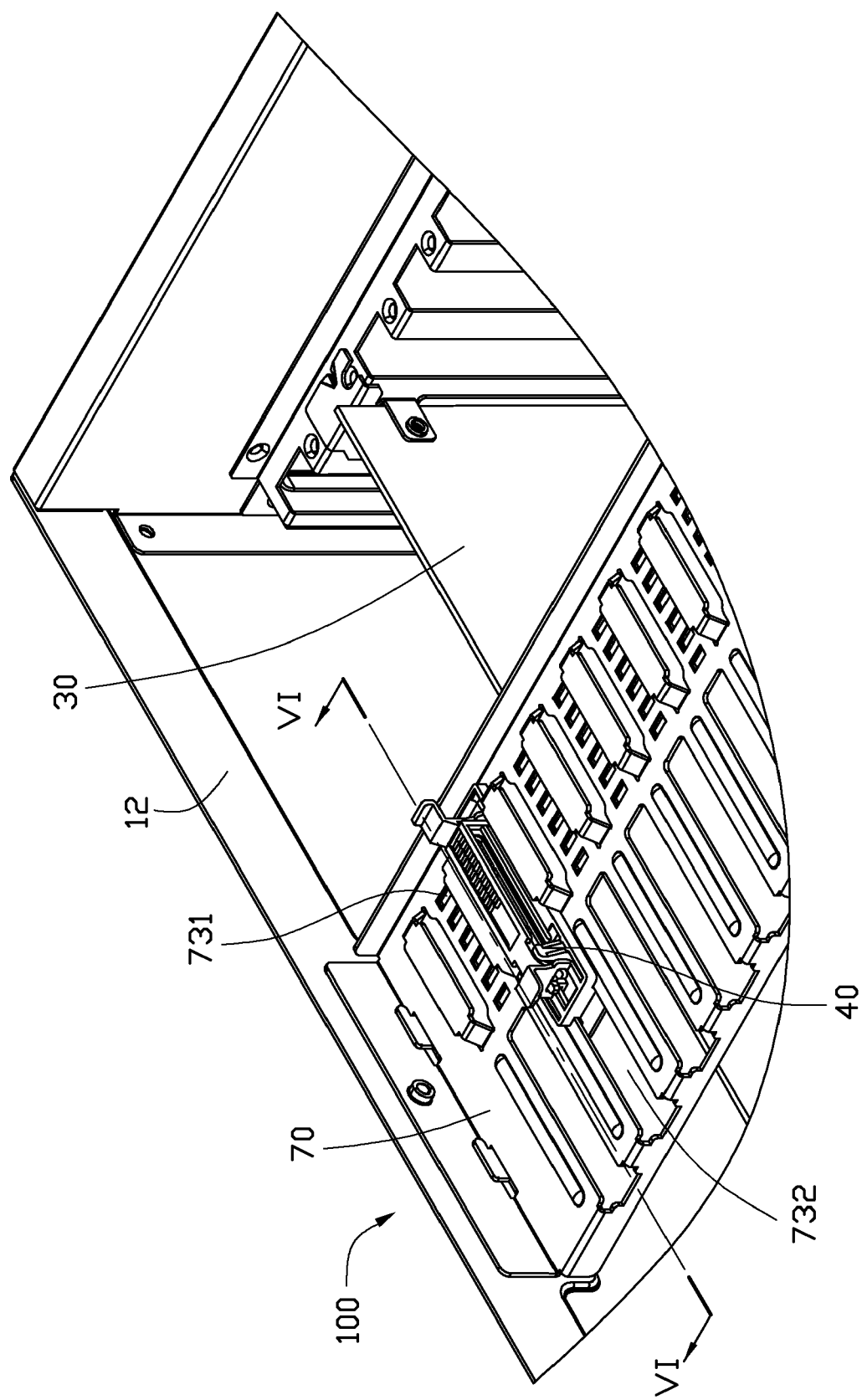
FIG. 5 is a partial, assembled, isometric view of the computer of FIG. 1.

Referring also to FIG. 5, during assembly of the computer 100, the support plate 70 of the retention assembly 40 is disposed between the two sidewalls 12 of the enclosure 10. The fixing holes 750 of the fixing plates 75 of the support plate 70 are respectively secured on the tabs 120 of the sidewalls 12 of the enclosure 10. The sleeves 752 of the fixing plates 75 of the support plate 70 are aligned with the screw holes 123 of the sidewalls 12, and the screws 79 extend through the screw holes 123 and screw into the sleeves 752, respectively, for securing the support plate 70 on the enclosure 10. At this time, one of the mounting units 73 of the support plate 70 is located over the expansion card 30, and the orienting holes 731 and the sliding groove 732 align with the expansion card 30.

Figure 7:
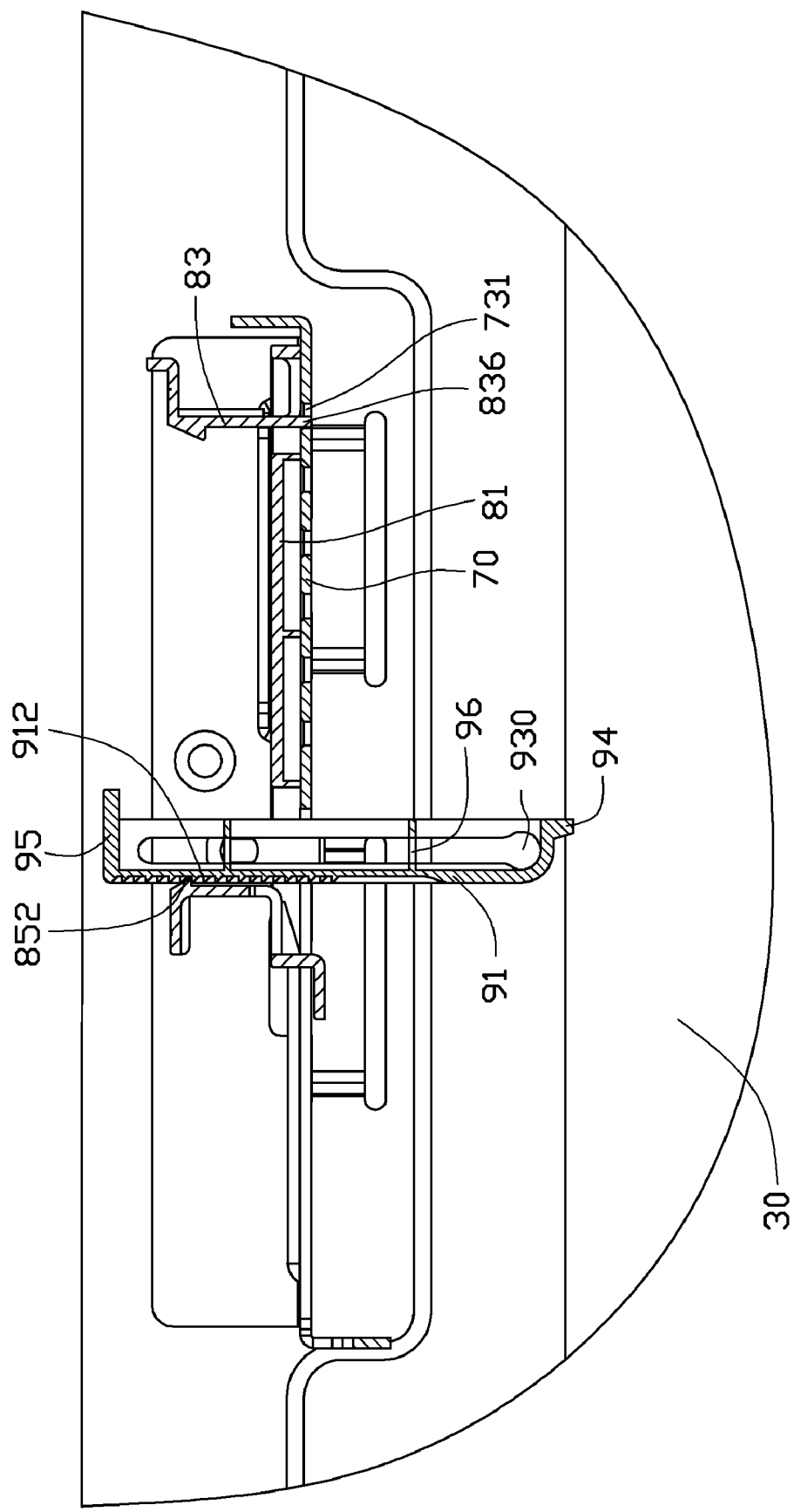
FIG. 7 is similar to FIG. 6, but shows the holder secured on an expansion card of the computer.

Referring to FIGS. 6 and 7, in use, the press portion 834 of the handle portion 83 of the retention seat 80 is pressed outwardly until the mounting hook 832 of the handle portion 83 is disengaged from the lateral side of the top plate 91 adjacent to the press plate 95. One end of the holder 90 with the press plate 95 is pulled upwardly until the holder 90 rotates around the pivot 863 of the retention seat 80 to a position perpendicular to the retention seat 80. The press plate 95 is pressed downwardly through the second through hole 815 of the retention seat 80 and the sliding groove 732 of the support plate 70 until the clamping portion 94 clamps a top side of the expansion card 30, especially, the top side of the expansion card 30 is clamped in the mounting slot 940 of the clamping portion 94. At this time, one of the teeth 912 of the holder 90 is engaged with the engaging hook 852 of the actuating portion 85.

In the present computer 100, the clamping portion 94 of the retention assembly 40 clamps the top side of the expansion card 30, thereby further securing the expansion card 30 to the enclosure 10. This is convenient to prevent the expansion card 30 coming loose from the enclosure 10 due to vibration during operation of the computer 100. In addition, the support plate 70 defines a plurality of orienting holes 731 therein. Thus, the stopper 838 of the retention seat 80 can be inserted into any one of the orienting holes 731 to adjust the retention seat 80 and the holder 90 to an effective position along the array direction of the orienting holes 731 (a direction parallel to the sliding plate 81 of the retention seat 80), whereby the holder 90 can clamp to an appropriate position of the top side of the expansion card 30 to secure the expansion card 30 effectively. Furthermore, the retention assembly 40 is capable of clamping expansion cards of different lengths via adjustment of the position of the retention seat 80 and the holder 90 along the array direction of the orienting holes 731. Moreover, the top plate 91 of the holder 90 forms a plurality of parallel teeth 912 thereon. Thus, the engaging hook 852 of the actuating portion 85 can engage with any one of the teeth 912 to adjust the holder 90 to an effective position along a direction vertical to the sliding plate 81 of the retention seat 80, whereby the retention assembly 40 is capable of clamping expansion cards of different heights.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retention assembly for securing an expansion card, comprising:
   a support plate defining a through hole therein;
   a retention seat mounted on the supporting plate, the retention seat defining a sliding groove therethrough aligning with the through hole of the support plate; and
   a holder located on the retention seat, the holder comprising a clamping portion at one end thereof, the holder extending through the sliding groove of the retention seat and the through hole of the supporting plate, the clamping portion of the holder extending beyond the supporting plate and configured for clamping the expansion card;
   wherein the support plate defines a plurality of orienting holes therein aligning with each other, the retention seat comprises a stopper, and the stopper is inserted into one of the orienting holes to adjust the retention seat and the holder to an effective position configured for clamping an appropriate position of the expansion card.

2. The retention assembly of claim 1, wherein the retention seat comprises an actuating portion adjacent to the through hole, the actuating portion comprises an engaging hook, the holder forms a plurality of teeth thereon, and the engaging hook engages with one of the teeth to adjust the holder to an effective position configured for clamping the expansion card.

3. The retention assembly of claim 2, wherein the retention seat further comprises a sliding plate in one end of which the through hole is defined, the actuating portion further comprises a connecting wall connecting the sliding plate, and a press portion at a top end of the connecting wall, and the engaging hook and the press portion extend out from two opposite sides of the connecting wall, respectively.

4. The retention assembly of claim 2, wherein the holder further comprises a top plate, a bottom plate parallel to the top plate, and a pivot portion connecting the top and bottom plates, the top and bottom plates cooperatively define a sliding slot therebetween, the pivot portion defines therein a pivot hole in communication with the sliding slot, the retention seat comprises a pivot adjacent to the through hole, and the pivot is pivotably received in the pivot hole.

5. The retention assembly of claim 4, wherein the teeth are parallel, and are formed on the top plate.

6. The retention assembly of claim 4, wherein the clamping portion is protruded out from the bottom plate adjacent to the pivot portion, the clamping portion defines a mounting slot therein, and the mounting slot is configured for a top side of the expansion card to be clamped therein.

7. The retention assembly of claim 4, wherein the retention seat further comprises a pair of support arms respectively at two opposite sides of the through hole, and the pivot is formed at an inner surface of each of the support arms.

8. The retention assembly of claim 7, wherein each of the support arms forms a claw at one end thereof toward the support plate, and the claws of the support arms abut on a bottom surface of the support plate beside the sliding groove.

9. The retention assembly of claim 1, wherein the retention seat further comprises an orienting portion at one end thereof, the orienting portion comprises an extension wall and an orienting wall extending out from the extension wall, the orienting wall is longer than the extension wall along the direction perpendicular to the sliding groove, and two opposite ends of the orienting wall beyond the extension wall abuts on a bottom surface of the support plate beside the sliding groove.

10. The retention assembly of claim 1, wherein the retention seat further comprises a handle portion at another end of the sliding plate away from the through hole, the handle portion comprises a connecting wall connecting the sliding plate, a mounting hook and a press portion at a top end of the connecting wall, the stopper extends toward the support plate from a bottom end of the connecting wall, the mounting hook and the press portion extend out from two opposite sides of the connecting wall, respectively, the mounting hook extends toward the through hole, and the press portion extends away from the through hole, when the retention assembly is at a non-retention position, the holder is hooked by the mounting hook of the handle portion.

11. The retention assembly of claim 1, wherein the support plate further comprises two guide portions located respectively two opposite sides of the orienting holes, each of the guide portions comprises a guide plate, and a pair of legs at two opposite ends of the guide plate, respectively, the guide plate is located above and parallel to the support plate, the pair of legs connects the guide plate with the support plate, for supporting the guide plate, a guide groove is defined between the guide plate and the support plate, and two lateral sides of the sliding plate are capable to slide in the guide grooves, respectively.

12. A computer, comprising:
    an enclosure;
    a main circuit board and an expansion card in the enclosure; and
    a retention assembly for securing the expansion card on the main circuit board, the retention assembly comprising a support plate mounted on the enclosure and located over the expansion card, a retention seat mounted on the supporting plate, and a holder located on the retention seat, the support plate defining a through hole therein, the retention seat defining a sliding groove therethrough aligning with the through hole of the support plate, the holder comprising a clamping portion at one end thereof, the holder extending through the sliding groove of the retention seat and the through hole of the supporting plate, the clamping portion of the holder extending beyond the supporting plate and clamping the expansion card;
    wherein the support plate defines a plurality of orienting holes therein aligning with each other, the retention seat comprises a stopper, and the stopper is inserted into one of the orienting holes to adjust the retention seat and the holder to an effective position configured for clamping an appropriate position of the expansion card.

13. The computer of claim 12, wherein the expansion card forms a card plug at a bottom side thereof, the card plug is inserted in the main board circuit, and the clamping portion of the holder clamps a top side of the expansion card.

14. The computer of claim 12, wherein the retention seat comprises an actuating portion adjacent to the through hole, the actuating portion comprises an engaging hook, the holder forms a plurality of parallel teeth thereon, and the engaging hook engages with one of the teeth to adjust the holder to an effective position configured for clamping the expansion card.

15. The computer of claim 14, wherein the retention seat further comprises a sliding plate in one end of which the through hole is defined, the actuating portion further comprises a connecting wall connecting the sliding plate, and a press portion at a top end of the connecting wall, and the engaging hook and the press portion extend out from two opposite sides of the connecting wall, respectively.

16. The computer of claim 14, wherein the holder further comprises a top plate, a bottom plate parallel to the top plate, and a pivot portion connecting the top and bottom plates, the top and bottom plates cooperatively define a sliding slot therebetween, the pivot portion defines therein a pivot hole in communication with the sliding slot, the retention seat comprises a pivot adjacent to the through hole, and the pivot is pivotably received in the pivot hole.

17. The computer of claim 16, wherein the clamping portion is protruded out from the bottom plate adjacent to the pivot portion, the clamping portion defines a mounting slot therein, and a top side of the expansion card is clamped in the mounting slot.

18. The computer of claim 12, wherein the support plate further comprises two guide portions located respectively two opposite sides of the orienting holes, each of the guide portions comprises a guide plate, and a pair of legs at two opposite ends of the guide plate, respectively, the guide plate is located above and parallel to the support plate, the pair of legs connects the guide plate with the support plate, for supporting the guide plate, a guide groove is defined between the guide plate and the support plate, and two lateral sides of the sliding plate are capable to slide in the guide grooves, respectively.

19. A retention assembly for securing an expansion card, comprising:
 a support plate defining a through hole therein;
 a retention seat mounted on the supporting plate, the retention seat defining a sliding groove therethrough aligning with the through hole of the support plate; and
 a holder located on the retention seat, the holder comprising a clamping portion at one end thereof, the holder extending through the sliding groove of the retention seat and the through hole of the supporting plate, the clamping portion of the holder extending beyond the supporting plate and configured for clamping the expansion card;
 wherein the holder further comprises a top plate, a bottom plate parallel to the top plate, and a pivot portion connecting the top and bottom plates, the top and bottom plates cooperatively define a sliding slot therebetween, the pivot portion defines therein a pivot hole in communication with the sliding slot, the retention seat comprises a pivot adjacent to the through hole, and the pivot is pivotably received in the pivot hole.

20. The retention assembly of claim 19, wherein the retention seat further comprises a pair of support arms respectively at two opposite sides of the through hole, and the pivot is formed at an inner surface of each of the support arms.

* * * * *